US012592416B2

(12) United States Patent
Lai et al.

(10) Patent No.: US 12,592,416 B2
(45) Date of Patent: Mar. 31, 2026

(54) SOLID-STATE ELECTROLYTE FILM AND SOLID-STATE BATTERY

(71) Applicants: HON HAI PRECISION INDUSTRY CO., LTD., New Taipei City (TW); SolidEdge Solution Inc., Hsinchu City (TW)

(72) Inventors: Hong-Zheng Lai, Hsinchu City (TW); Tseng-Lung Chang, Hsinchu City (TW)

(73) Assignees: HON HAI PRECISION INDUSTRY CO., LTD., New Taipei City (TW); SolidEdge Solution Inc., Hsinchu City (TW)

( * ) Notice: Subject to any disclaimer, the term of this patent is extended or adjusted under 35 U.S.C. 154(b) by 687 days.

(21) Appl. No.: 17/896,610

(22) Filed: Aug. 26, 2022

(65) Prior Publication Data

US 2023/0163354 A1    May 25, 2023

(30) Foreign Application Priority Data

Sep. 3, 2021    (TW) ................................. 110132901
Jul. 28, 2022    (TW) ................................. 111128350

(51) Int. Cl.
*H01M 10/0565*    (2010.01)
*H01M 10/056*    (2010.01)
(52) U.S. Cl.
CPC ..... *H01M 10/0565* (2013.01); *H01M 10/056* (2013.01); *H01M 2300/0065* (2013.01); *H01M 2300/0077* (2013.01); *H01M 2300/0082* (2013.01)

(58) Field of Classification Search
CPC ........... H01M 10/056; H01M 10/0565; H01M 2300/0065; H01M 2300/0077; H01M 2300/0082
See application file for complete search history.

(56) References Cited

U.S. PATENT DOCUMENTS 6,506,523 B1 *    1/2003  Hatazawa ......... H01M 10/0565
                                                        429/316
10,818,963 B2 *  10/2020  Makino ................. H01M 4/505
                     (Continued)

FOREIGN PATENT DOCUMENTS

CN          1266540 A      9/2000
CN        105098234 A    11/2015
CN        107615553 A      1/2018
                  (Continued)

OTHER PUBLICATIONS

"A Basic Guide to Particle Characterization", Malvern Instruments Worldwide, 2012, 26 pgs.
                  (Continued)

*Primary Examiner* — Niki Bakhtiari
*Assistant Examiner* — Dustin Van Kirk
(74) *Attorney, Agent, or Firm* — CKC & Partners Co., LLC

(57)            ABSTRACT

A solid-state electrolyte film includes a first lithium salt, a first polymer, a second polymer, and a solid-state electrolyte. The first polymer has a weight average molecular weight of between 60,000 g/mol and 1,800,000 g/mol. The second polymer has a granular shape. The solid-state electrolyte has a granular shape and a particle size (D50) of between 50 nm and 2 μm.

20 Claims, 1 Drawing Sheet

(56) References Cited

U.S. PATENT DOCUMENTS

| | | | | |
|---|---|---|---|---|
| 2020/0153033 A1* | 5/2020 | Mimura | ............ | H01M 10/0525 |
| 2020/0403266 A1* | 12/2020 | Hu | .................... | H01M 10/0585 |

FOREIGN PATENT DOCUMENTS

| | | | | | |
|---|---|---|---|---|---|
| CN | 110212160 A | | 9/2019 | | |
| CN | 110265711 A | | 9/2019 | | |
| CN | 110945702 A | | 3/2020 | | |
| CN | 111234240 A | | 6/2020 | | |
| CN | 111247663 A | * | 6/2020 | .......... | H01M 10/052 |
| CN | 112072169 A | | 12/2020 | | |
| CN | 113013380 A | * | 6/2021 | ........ | H01M 10/0525 |
| EP | 3306731 A1 | | 4/2018 | | |
| TW | I620370 B | | 4/2018 | | |
| TW | I705601 B | * | 9/2020 | ........ | H01M 10/0565 |

OTHER PUBLICATIONS

"Thermal Analysis of Polymers", Selected Applications (handbook), ed. Mettler Toledo, 40 pgs.
Deng, Y. et al., "$Al_2O_3$/PVdF-HFP-CMC/PE separator prepared using aqueous slurry and post-hot-pressing method for polymer lithium-ion batteries with enhanced safety", Electrochimica Acta, 212, Sep. 10, 2016, 416-425.
Dent, T., "GPC/SEC Practical Tips and Tricks", Agilent Technologies, Gulf Coast Conference, Oct. 2011, 38 pgs.
Ghosh, P., "Molecular Weights of Polymers", Polymer Science, Fundamentals of Polymer Science (Polymer Study Centre), Sep. 21, 2006, 22 pgs.

* cited by examiner

100
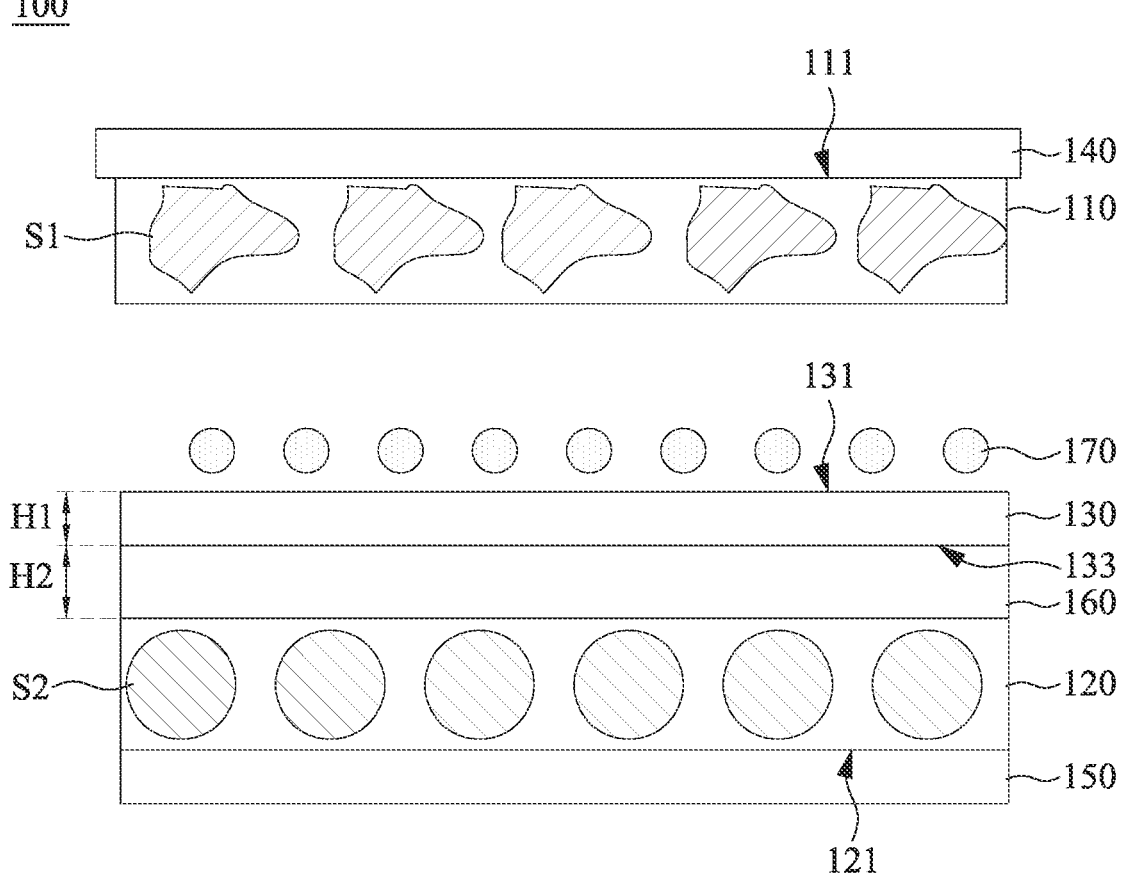

SOLID-STATE ELECTROLYTE FILM AND SOLID-STATE BATTERY

RELATED APPLICATION

This application claims priority to Taiwan Application Serial Number 110132901, filed Sep. 3, 2021, and Taiwan Application Serial Number 111128350, filed Jul. 28, 2022, all of which are herein incorporated by reference.

BACKGROUND

Field of Invention

The present disclosure relates to a solid-state electrolyte film and a solid-state battery including the solid-state electrolyte film.

Description of Related Art

With the rapid development of technology, various kinds of portable batteries are gradually introduced, and people's demand for high performance and light weight of portable batteries is also increasing. As these demands become stronger, lithium-ion batteries are highly concerned and widely used due to their high energy density and rapid charging. For lithium-ion batteries, liquid electrolytes are often used as the conductive materials for batteries, but liquid electrolytes have the risk of liquid leakage or lack of long-term stability, as well as the problems of corrosion, flammability, poor safety, and low reliability, which cannot meet the safety requirements.

In view of this, solid electrolytes are gradually replacing the more dangerous liquid electrolytes. However, there are still many problems with solid electrolytes, such as low ionic conductivity at room temperature and high interface impedance between solid electrolytes and positive and negative electrodes. Therefore, how to effectively improve the above-mentioned shortcomings of solid electrolytes is the focus of research and development in the industry.

SUMMARY

According to some embodiments of the present disclosure, a solid-state electrolyte film includes a first lithium salt, a first polymer, a second polymer, and a solid-state electrolyte. The first polymer has a weight average molecular weight of between 60,000 g/mol and 1,800,000 g/mol. The second polymer has a granular shape. The solid-state electrolyte has a granular shape and a particle size (D50) of between 50 nanometers (nm) and 2 microns (µm).

In some embodiments of the present disclosure, the first lithium salt, the first polymer, the second polymer, and the solid-state electrolyte have a weight ratio of 16 to 25:26 to 34:5 to 20:10 to 40.

In some embodiments of the present disclosure, the first polymer is a fluorine-containing polymer.

In some embodiments of the present disclosure, the first polymer has a melting point of between 160° C. and 175° C. and a thermal stability temperature of between 300° C. and 400° C.

In some embodiments of the present disclosure, the first lithium salt comprises lithium fluoride, lithium bis(fluorosulfonyl)imide, lithium bis(trifluoromethane)sulfonimide, lithium bis(tetrafluoroethane)sulfonimide, lithium bis(oxalato)borate, or combinations thereof.

In some embodiments of the present disclosure, the first polymer comprises polyvinylidene difluoride, polyvinylidene fluoride-hexafluoropropylene copolymer, or combinations thereof, and the second polymer comprises poly (acrylic acid), polymethyl methacrylate, boron trifluoride-diethyl etherate complex, polyethylene glycol, poly (ethylene glycol) diglycidyl ether, or combinations thereof.

In some embodiments of the present disclosure, the solid-state electrolyte comprises lithium lanthanum zirconium oxide, lithium lanthanum zirconium tantalum oxide, lithium lanthanum titanium oxide, lithium lanthanum tantalum oxide, titanium lithium aluminum phosphate, or combinations thereof.

In some embodiments of the present disclosure, the solid-state electrolyte includes $Li_7La_3Zr_2O_{12}$, $Li_{5.5}La_3Zr_{1.75}Ta_{0.25}O_{12}$, $La_{0.57}Li_{0.29}TiO_3$, $Li_{0.36}La_{0.57}Ta_{0.6}O_3$, $Li_{1.3}Al_{0.3}Ti_{1.7}(PO_4)_3$, or combinations thereof.

In some embodiments of the present disclosure, the first polymer has a first weight average molecular weight, a second weight average molecular weight, and a third weight average molecular weight, the first weight average molecular weight is between 800,000 g/mol and 1,000,000 g/mol, the second weight average molecular weight is between 1,300,000 g/mol and 1,500,000 g/mol, and the third weight average molecular weight is between 60,000 g/mol and 200,000 g/mol.

In some embodiments of the present disclosure, the first polymer with the first weight average molecular weight, the first polymer with the second weight average molecular weight, and the first polymer with the third weight average molecular weight have a weight ratio of 6 to 10:1.5 to 3:1.

In some embodiments of the present disclosure, the solid-state electrolyte has a first particle size (D50), a second particle size (D50), and a third particle size (D50), the first particle size (D50) is between 0.8 microns and 1.4 microns, the second particle size (D50) is between 0.25 microns and 0.5 microns, and the third particle size (D50) is between 80 nanometers to 150 nanometers.

In some embodiments of the present disclosure, the solid-state electrolyte with the first particle size (D50), the solid-state electrolyte with the second particle size (D50), and the solid-state electrolyte with the third particle size (D50) have a weight ratio of 10 to 20:30 to 45:35 to 50.

According to some embodiments of the present disclosure, a solid-state battery includes any of the aforementioned solid-state electrolyte film, a positive electrode, and a negative electrode. The solid-state electrolyte film has a thickness of between 20 µm and 70 µm. The positive electrode and the negative electrode are respectively disposed on two opposite surfaces of the solid-state electrolyte film.

In some embodiments of the present disclosure, the solid-state battery further includes a gel structure and a buffer structure. The gel structure is disposed between the positive electrode and the solid-state electrolyte film, and includes a second lithium salt, the first polymer, and a crystallization inhibiting additive. The buffer structure is disposed between the negative electrode and the solid-state electrolyte film, in which the buffer structure is the gel structure or an ionic liquid.

In some embodiments of the present disclosure, the gel structure has a thickness of between 1 µm and 10 µm, and a volume of the ionic liquid on the solid-state electrolyte film is between 10 µL and 40 µL per square centimeter.

In some embodiments of the present disclosure, the second lithium includes lithium bis(fluorosulfonyl)imide, lithium bis(trifluoromethane)sulfonimide, lithium(fluorosulfonyl)((3-(1-methyl-1H-imidazol-3-ium-3-yl)propyl) sulfonyl)imide), N,N-bis(trifluoromethylsulfonyl aniline), or combinations thereof.

In some embodiments of the present disclosure, the second lithium salt, the first polymer, and the crystallization inhibiting additive have a weight ratio of 15 to 30:30 to 40:5 to 15.

In the aforementioned embodiments of the present disclosure, since the solid-state electrolyte film of the present disclosure includes the first lithium salt, the first polymer, the second polymer, and the solid-state electrolyte with a specific particle size, the solid-state electrolyte film can have a high ionic conductivity at room temperature, which can further improve the overall performance of the solid-state battery. On the other hand, since the first lithium salt, the first polymer, the second polymer, and the solid-state electrolyte are directly integrated into a single film to form the solid-state electrolyte film, the convenience of the manufacturing process can be greatly improved.

BRIEF DESCRIPTION OF THE DRAWINGS

The disclosure can be more fully understood by reading the following detailed description of the embodiments, with reference made to the accompanying drawings as follows:

The single FIGURE illustrates a cross-sectional schematic view of a solid-state battery according to some embodiments of the present disclosure.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

It should be understood that relative terms such as "lower" or "bottom" and "upper" or "top" can be used herein to describe the relationship between one element and another element, as shown in the figures. It should be understood that relative terms are intended to include different orientations of the device other than those shown in the figures. For example, if the device in one FIGURE is turned over, elements described as being on the "lower" side of other elements will be oriented on the "upper" side of the other elements. Therefore, the exemplary term "lower" may include an orientation of "lower" and "upper", depending on the specific orientation of the drawing. Similarly, if the device in one FIGURE is turned over, elements described as "below" other elements will be oriented "above" the other elements. Therefore, the exemplary term "below" can include an orientation of "above" and "below".

The present disclosure provides a solid-state electrolyte film and a solid solid-state battery including the solid-state electrolyte film. Since the solid-state electrolyte film of the present disclosure includes a lithium salt, two types of polymers, and a solid-state electrolyte with a specific particle size, the solid-state electrolyte film can have higher ionic conductivity. In addition, by compactly attaching the electrodes (positive/negative electrode) to the solid-state electrolyte film using a gel structure with ionic conductivity similar to that of the solid-state electrolyte film, a lower interface impedance can be achieved between the solid-state electrolyte film and the electrodes, which is beneficial for the ion conduction at the interface. In this way, the solid-state battery can perform well even at room temperature (for example, at a temperature between 20° C. and 60° C.).

Reference is made to the FIGURE, which illustrates a cross-sectional schematic view of a solid-state battery 100 according to some embodiments of the present disclosure. The solid-state battery 100 of the present disclosure includes a negative electrode, a positive electrode, and a solid-state electrolyte film 130, in which the negative electrode may, for example, include a negative electrode material layer 110 and a negative electrode current collector 140, and the positive electrode may, for example, include a positive electrode material layer 120 and a positive electrode current collector 150. In some embodiments, the negative electrode may include a negative electrode material layer 110 of negative electrode material S1 of such as graphite, mesophase carbon microbeads, silicon carbon, silicon oxycarbon, lithium metal, lithium alloy, lithium titanate (LTO), or combinations thereof, and a negative electrode current collector 140 such as a copper foil; and the positive electrode may include a positive electrode material layer 120 of a positive electrode material S2 of such as nickel cobalt manganese (NCM), nickel cobalt manganese aluminum (NCMA), lithium cobalt oxide (LCO), lithium nickel manganese oxide (LNMO), lithium manganese oxide (LMO), nickel cobalt aluminum (NCA), lithium iron phosphate (LiFePO$_4$, LFP), lithium manganese iron phosphate (LMFP), or combinations thereof, and a positive electrode current collector 150 such as an aluminum foil. In some embodiments, the negative electrode and the positive electrode are respectively disposed on two opposite surfaces (for example, a first surface 131 and a second surface 133) of the solid-state electrolyte film 130. In detail, the negative electrode material layer 110 and the positive electrode material layer 120 sandwich the solid-state electrolyte film 130 therebetween, and the negative electrode current collector 140 and the positive electrode current collector 150 sandwich the negative electrode material layer 110, the positive electrode material layer 120, and the solid-state electrolyte film 130 therebetween.

In some embodiments, the solid-state battery 100 may further include a gel structure 160 and a buffer structure 170. The gel structure 160 may be disposed between the positive electrode material layer 120 and the solid-state electrolyte film 130, and the buffer structure 170 may be disposed between the negative electrode material layer 110 and the solid-state electrolyte film 130. In some embodiments, the buffer structure 170 is equivalent to the gel structure 160, that is, the gel structure 160 may be disposed not only between the positive electrode material layer 120 and the solid-state electrolyte film 130, but also between the negative electrode material layer 110 and the solid-state electrolyte film 130. In some other embodiments, the buffer structure 170 is an ionic liquid (as will be further discussed below). The structure of the solid-state battery 100 of the present disclosure is generally as shown above and in the FIGURE. In the following description, the solid-state electrolyte film 130, the gel structure 160, and the buffer structure 170 in the solid-state battery 100 will be further described in more detail. It should be noted that, for the sake of clarity, some of the components in the solid-state battery 100 are shown as separate from each other in the FIGURE, but in the actual structure of the solid-state battery 100, these components are tightly attached to each other.

In some embodiments, the solid-state electrolyte film 130 includes a first lithium salt, a first polymer, a second polymer, and a solid-state electrolyte, and the first lithium salt, the first polymer, the second polymer, and the solid-state electrolyte are uniformly mixed with each other. Specifically, the first lithium salt may be, for example, lithium fluoride (LIF), lithium bis(fluorosulfonyl)imide (LiO$_4$NS$_2$F$_2$, LiFSI), lithium bis(trifluoromethane)sulfonimide (LiN(CF$_3$SO$_2$)$_2$, LiTFSI), lithium bis(tetrafluoroethane)sulfonimide (Li(C$_2$F$_5$SO$_2$)$_2$N, LiBETI), lithium bis(oxalato)borate (LiB(C$_2$O$_4$)$_2$), LiBOB), or combinations thereof; the first polymer may be, for example, polyvinylidene difluoride (PVDF), polyvinylidene fluoride-hexafluoropropylene copolymer (PVDF-HFP), or combinations thereof; the second polymer may be, for example, poly(acrylic acid) (PAA), polymethyl methacrylate (PMMA), boron trifluoride-diethyl etherate complex (BF$_3$·OEt$_2$), poly(ethylene glycol) diglycidyl ether, (DIEPEG) polyethylene glycol (PEG), or combinations thereof; and the solid-state electrolyte may be, for example, lithium lanthanum zirconium oxide (e.g., Li$_7$La$_3$Zr$_2$O$_{12}$ (LLZO)), lithium lanthanum zirconium tantalum oxide (e.g., Li$_{5.5}$La$_3$Zr$_{1.75}$Ta$_{0.25}$O$_{12}$ (LLZTO)), lithium lanthanum titanium oxide, (e.g., La$_{0.57}$Li$_{0.29}$TiO$_3$ (LLTO)), lithium lanthanum tantalum oxide (e.g., Li$_{0.35}$La$_{0.57}$Ta$_{0.6}$O$_3$ (LLTaO)), titanium lithium aluminum phosphate (e.g., Li$_{1.3}$Al$_{0.3}$Ti$_{1.7}$(PO$_4$)$_3$ (LATP)), or combinations thereof.

In some embodiments, the solid-state electrolyte film 130 can be made more tenacious and mechanically resistant by controlling the weight average molecular weight of the first polymer within a certain range. Specifically, since the negative electrode material layer 110 and the positive electrode material layer 120 will continuously press the solid-state electrolyte film 130 during the operation of the solid-state battery 100, the weight average molecular weight of the first polymer may be controlled to make the solid-state electrolyte film 130 have good tenacity and mechanical resistance to avoid affecting the cyclic performance of the solid-state battery 100 due to expansion and press of the negative electrode material layer 110 and the positive electrode material layer 120, and thus prevent short circuit of the solid-state battery 100. In some embodiments, the weight average molecular weight of the first polymer is between 60,000 g/mole and 1,800,000 g/mol. In detail, if the weight average molecular weight of the first polymer is less than 60,000 g/mol, the degree of linkage of the first polymer may be poor, which prevents it from providing good tenacity and mechanical resistance of the solid-state electrolyte film 130; if the weight average molecular weight of the first polymer is greater than 1,800,000 g/mol, the viscosity of the first polymer may be too high, which is not conducive to the coating of the colloid (the colloid can be regarded as the precursor of the solid-state electrolyte film 130) during the manufacturing process, and may further affect the yield of the solid-state electrolyte film 130. In some preferred embodiments, the weight average molecular weight of the first polymer may be between 80,000 g/mol and 1,300,000 g/mol to better achieve the above-mentioned effects.

In some embodiments, the first polymer includes three different molecular weights of the polymer. In detail, the first polymer has a first weight average molecular weight, a second weight average molecular weight, and a third weight average molecular weight, in which the first weight average molecular weight is between 800,000 g/mol and 1,000,000 g/mol, the second weight average molecular weight is between 1,300,000 g/mol and 1,500,000 g/mol, and the third weight average molecular weight is between 60,000 g/mol and 200,000 g/mol. The first polymer with the first weight average molecular weight can be used as the main reagent for film formation, which can become the main structure of the solid-state electrolyte film 130 after molding, and its viscosity in the colloidal state is suitable for film coating, which is conducive to the molding of the solid-state electrolyte film 130. The first polymer with the second weight average molecular weight can help to improve the mechanical strength (e.g., extensibility and stress) of the solid-state electrolyte film 130. The first polymer with the third weight average molecular weight can be used as a dispersant and a protective agent for the solid-state electrolyte so that the solid-state electrolyte is completely and uniformly dispersed in the solid-state electrolyte film 130. If the mechanical strength of the solid-state electrolyte film 130 is to be improved, compared to merely using a polymer with a weight average molecular weight of 1,000,000 g/mol or less as the first polymer, using a first polymer with the second weight average molecular weight at the same time can achieve a better mechanical strength. Using only a polymer with a weight average molecular weight of 1,300,000 g/mol to 1,500,000 g/mol as the first polymer, it is more difficult to coat the colloid and the film thickness and conditions are not easily controlled. Overall, by making the first polymer include three different molecular weights of polymers, the solid-state electrolyte film 130 can be facilitated for film formation and have a stable main structure, and the solid-state electrolyte film 130 can have excellent mechanical strength, and at the same time, the solid-state electrolyte is completely and uniformly dispersed in the solid-state electrolyte film 130. In some embodiments, the first polymer with the first weight average molecular weight, the first polymer with the second weight average molecular weight, and the first polymer with the third weight average molecular weight have a weight ratio of 6 to 10:1.5 to 3:1 to achieve the above effects.

In some embodiments, the solid-state electrolyte film 130 can be made to have better properties by controlling the melting point of the first polymer within a certain range. Specifically, during the molding of the solid-state electrolyte film 130, the solvent (the solvent may be, for example, 4-dimethylaminopyridine, dimethylformamide, or combinations thereof, with a small amount of toluene to enhance volatility if necessary) may leave the colloid through a baking process, such that the colloid gradually forms a film. In order to avoid that the tiny holes or defects formed by the solvent evaporation will adversely affect the properties of the solid-state electrolyte film 130 (for example, holes or defects are generated longitudinally through the through the solid-state electrolyte film 130, allowing micro-short circuit to occur in the solid-state battery 100), the solvent on the surface of the colloid can first be completely removed during the baking process (this step is referred to as the first stage), and then the temperature is gradually increased to make the polymer in the colloid approach its glass transition temperature (Tg), reach a partially molten state (this step is referred to as the second stage), and then start to flow to fill the holes or defects created by solvent evaporation. Based on the above, by controlling the melting point of the first polymer, the first polymer can be maintained in a solid state in the first stage and reach a partially molten state in the second stage, so as to avoid the electrical problems such as micro-short circuits in the solid-state electrolyte film 130 after film formation, and further improve the electrical functions of the solid-state electrolyte film 130. In some embodiments, the melting point of the first polymer may be between 160° C. and 175° C. In detail, if the melting point of the first polymer is less than 160° C., the first polymer may reach the molten state in the first stage, which may interfere with the removal of the solvent; and if the melting point of the first polymer is greater than 175° C., the first polymer may not reach the molten state properly in the second stage, resulting in too many holes or defects in the solid-state electrolyte film 130, which may further affect the electrical functions of the solid-state battery 100. In a preferred embodiment, the melting point of the first polymer may be between 160° C. and 165° C. to better achieve the above-mentioned effects. On the other hand, since a certain amount of heat is generated during the operation of the solid-state battery 100, controlling the melting point of the first polymer within the above range may prevent the first polymer from melting during operation of the solid-state battery 100 and causing a short circuit. In some embodiments, the thermal stability temperature of the first polymer (for example, the thermal decomposition temperature obtained by thermogravimetric analysis of the first polymer) may be between 300° C. and 400° C. to have good stability, further enabling the solid-state battery 100 to have good thermal stability during operation. In some embodiments, the crystallizing point of the first polymer is between 120° C. and 140° C. (preferably between 120° C. and 130° C.) to provide good film-forming properties.

In some embodiments, the second polymer has a granular shape to moderately disrupt the continuous extension of the film formed by the first polymer. Specifically, since the first polymer is a small non-particulate material with good film-forming properties, when the first polymer is present alone, it is easy to form a continuously extending film, and when the second polymer is mixed with the first polymer, the second polymer in particulate form can appropriately break (adjust) the linkage between the first polymer to produce a suitable amount of pore patterns in the solid-state electrolyte film 130, thereby further improving the ion penetration, resulting in an increase in the ionic conductivity. In some embodiments, the above-mentioned effects can be further better achieved through the ratio of the first polymer and the second polymer. Specifically, the weight ratio of the first polymer and the second polymer can be controlled within a range of 16 to 25:26 to 34.

In some embodiments, the solid-state electrolyte has a granular shape, and the particle size (D50) of the solid-state electrolyte is between 50 nm and 2 nm to enhance the electrical functions of the solid-state electrolyte film 130. More specifically, when the particle size of the solid-state electrolyte falls within the above-mentioned range, the particle size is small and uniform in size, so that the uneven surface of the solid-state electrolyte film 130 caused by the large-sized solid-state electrolyte can be avoided, and furthermore, the solid-state electrolyte film 130 and its adjacent layers (for example, the gel structure 160 and the buffer structure 170) can be tightly and fully engaged with other to avoid air present between the solid-state electrolyte film 130 and the adjacent layers, thereby avoiding short circuits or poor performance. In addition, the small and uniform particle size of the solid-state electrolyte can also facilitate the uniform dispersion of the solid-state electrolyte in the solid-state electrolyte film 130 to avoid the occurrence of unevenness on the surface of the solid-state electrolyte film 130. Based on the above, since the unevenness of the surface of the solid-state electrolyte film 130 does not occur, the poorer performance of the solid-state electrolyte film 130 due to uneven stress can be avoided. On the other hand, since the total number of solid-state electrolytes with small particle size is greater than the total number of solid-state electrolytes with large particle size for the same mass, the channels formed by solid-state electrolytes with small particle size are higher than those formed by solid-state electrolytes with large particle size, such that the solid-state electrolytes with small particle size can provide better conductivity, which in turn improves the ionic conductivity in the solid-state battery 100. It is worth noting that, in general, the smaller the particle size of the solid-state electrolyte, the larger the grain boundary surface area and contact area it can produce. However, the solid-state electrolyte with small particle size is prone to react too vigorously during the coating process, resulting in unnecessary side reactions. Hence, in a preferred embodiment, the particle size of the solid-state electrolyte can be less than 500 nm (e.g., between 50 nm and 300 nm) to better accommodate the need for homogeneity during coating and conductivity after coating.

In some embodiments, the solid-state electrolyte has three different particle sizes (D50). In detail, the solid-state electrolyte has a first particle size (D50), a second particle size (D50), and a third particle size (D50), in which the first particle size is between 0.8 $\mu m$ and 1.4 $\mu m$, the second particle size is between 0.25 $\mu m$ and 0.5 $\mu m$, and the third particle size is between 80 nm and 150 nm. Specifically, as mentioned above, when the number of the solid-state electrolytes with small particle size is increased, it means that there are more channels per unit volume. However, the solid-state electrolytes with small particle size are also prone to react too vigorously during the coating process and cause lithium fluorination, which makes it difficult to coat the colloid and affects the thickness of the solid-state electrolyte film 130. Therefore, after considering the above-mentioned reactivity issues, solid-state electrolytes with larger particle sizes (i.e., the first and second particle sizes) can be selected to replace a portion of the solid-state electrolytes with a smaller particle size (i.e., the third particle size) to make the film formation of the solid-state electrolyte film 130 smoother, and by mixing solid-state electrolytes with different particle sizes, the final solid-state electrolyte film 130 can be formed with a stronger structural strength. Overall, the solid-state electrolyte film 130 can have better film-forming properties and a stronger structural strength through the configuration of the three different particles sizes of solid-state electrolytes. In some embodiments, the solid-state electrolyte with the first particle size, the solid-state electrolyte with the second particle size, and the solid-state electrolyte with the third particle size have a weight ratio of 10 to 20:30 to 45:35 to 50 to better achieve the above effects.

Based on the above, the solid-state electrolyte film 130 of the present disclosure may include the first lithium salt, the first polymer, the second polymer, and the solid-state electrolyte, and the weight ratio of the first lithium salt, the first polymer, the second polymer, and the solid-state electrolyte is 16 to 25:26 to 34:5 to 20:10 to 40, so that the solid-state electrolyte film 130 has a better uniformity and thus provides a better ion penetration rate and conductivity. In some embodiments, the thickness H1 of the solid-state electrolyte film 130 may be between 10 $\mu m$ and 100 $\mu m$ to have good resistance and tenacity as well as a suitable energy density. In detail, when the thickness H1 of the solid-state electrolyte film 130 is less than 10 $\mu m$, it tends to cause the solid-state electrolyte film 130 to be torn or pierced; when the thickness H1 of the solid-state electrolyte film 130 is greater than 100 $\mu m$, it tends to cause the energy density of the solid-state electrolyte film 130 to be insufficient. In a preferred embodiment, the thickness H1 of the solid-state electrolyte film 130 may be between 20 $\mu m$ and 70 $\mu m$ to better achieve the above-mentioned effects.

In some embodiments, the gel structure 160 may include a second lithium salt, the aforementioned first polymer, and a crystallization inhibiting additive. Specifically, the second lithium salt may be, for example, lithium bis(fluorosulfonyl) imide ($LiO_4NS_2F_2$, LiFSI), lithium bis(trifluoromethane) sulfonimide ($LiN(CF_3SO_2)_2$, LiTFSI), lithium(fluorosulfonyl)((3-(1-methyl-1H-imidazol-3-ium-3-yl)propyl)sulfonyl)

imide) (LiFSMIPTFSI), N,N-bis(trifluoromethylsulfonyl aniline), or combinations thereof; the first polymer may be, for example, polyvinylidene fluoride, polyvinylidene fluoride-hexafluoropropylene copolymer, or combinations thereof, as described above; a suitable crystallization inhibiting additive may be, for example, acrylate polymers such as poly(butyl acrylate), poly(ethylhexyl acrylate), or polymethyl methacrylate; aluminum oxide; silicon dioxide, or combinations thereof. The presence of the crystallization inhibiting additive in the gel structure 160 can adjust the crystallization status of the first polymer and increase the ionic conductivity. Since the gel structure 160 can be disposed between the electrode (positive/negative electrode) and the solid-state electrolyte film 130, it can avoid affecting the ionic conductivity of the solid-state battery 100 due to the presence of air between the electrode and the solid-state electrolyte film 130, and can reduce the interface impedance between the electrode and the solid-state electrolyte film 130. In addition, when the surface of the solid-state electrolyte film 130 still has a small amount of bumpy spots, the gel structure 160 can be configured to bind closely to the solid-state electrolyte film 130 having an uneven surface, such that the solid-state electrolyte film 130 can be tightly combined with the electrode through the gel structure 160. On the other hand, since the formulation of the gel structure 160 is similar to the formulation of the solid-state electrolyte film 130 (for example, both the gel structure 160 and the solid-state electrolyte film 130 include lithium salt and the first polymer), the gel structure 160 is highly compatible with the solid-state electrolyte film 130, which helps to improve the electrical functions of the solid-state battery 100.

In some embodiments, the weight ratio of the second lithium salt, the first polymer, and the crystallization inhibiting additive falls within a range of 15 to 30:30 to 40:5 to 15, further ensuring that the solid content of the gel structure 160 is lower than the solid content of the solid-state electrolyte film 130. In some embodiments, the thickness H2 of the gel structure 160 is between 1 μm and 10 μm, such that the gel structure 160 has good resistance and tenacity as well as a suitable energy density. In detail, when the thickness H2 of the gel structure 160 is less than 1 μm, it tends to cause the gel structure 160 to be torn or pierced; when the thickness H2 of the gel structure 160 is greater than 10 μm, it tends to cause the energy density of the gel structure 160 to be insufficient. In a preferred embodiment, the thickness H2 of the gel structure 160 may be between 3 μm and 5 μm to better achieve the above-mentioned effects.

In some embodiments, when the buffer structure 170 is an ionic liquid, the ionic liquid may be, for example, N-methyl-N-propylpyrrolidiniumbis(trifluoromethanesulfonyl)imide, [pyr$_{13}$][Ntf$_2$]), LiO$_4$NS$_2$F$_2$ dissolved in diethylpyrrolidinium bis(fluorosulfonyl)imide, Li[FSI] in [C$_2$epyr][FSI]), lithium difluoro(oxalato)borate (C$_2$BF$_2$LiO$_4$, LiDFOB), diethylpyrrolidinium bis(fluorosulfonyl)imide/N-methyl-N-propylpyrrolidinium bis(fluorosulfonyl)imide (LiO$_4$NS$_2$F$_2$/C$_8$H$_{18}$F$_2$N$_2$O$_4$S$_2$, LiFSI/PMPFSI), lithium bis(trifluoromethane)sulfonimide/N-methyl-N-propylpyrrolidinium bis(fluorosulfonyl)imide (LiN(CF$_3$SO$_2$)$_2$/C$_8$H$_{18}$F$_2$N$_2$O$_4$S$_2$, LiTFSI/PMPFSI), or combinations thereof. The ionic liquid can effectively increase the ionic conductivity, and only a small amount of ionic liquid is required to achieve good ionic conductivity and reduce the interface impedance between the negative electrode material layer 110 and the solid-state electrolyte film 130. In some embodiments, a volume of the ionic liquid on the solid-state electrolyte film 130 is between 10 μL and 40 μL per square centimeter. In detail, if the volume of the ionic liquid is less than 10 μL, it may result in low ion transfer efficiency or failure of performance under low temperature; if the volume of the ionic liquid is greater than 40 μL, it may result in low energy density. On the other hand, since the ionic liquid is resistant to low/high temperatures (for example, the ionic liquid can withstand a temperature of between −95° C. and 400° C.), the safety of the solid-state battery 100 during operation can be ensured.

It should be understood that the connection relationships and effects of the components that have been described will not be repeated hereinafter. In the following description, a manufacturing method of the solid-state battery 100 will be briefly discussed.

Firstly, the solvent (the solvent may be, for example, 4-dimethylaminopyridine, dimethylformamide, or combinations thereof, with a small amount of toluene, if necessary), the first polymer, the second polymer, the first lithium salt, and the solid-state electrolyte are sequentially placed in a planetary mixer and mixed to form a mixture, and the viscosity change of the mixture during stirring is monitored with a viscometer to control the viscosity of the mixture between 3000 cps and 5000 cps to ensure that the colloid formed is conducive to coating. In detail, when the viscosity of the above mixture is lower than 3000 cps, it is easy to cause the colloid to be too high in fluidity and unfavorable for coating; when the viscosity of the mixture is higher than 5000 cps, it is easy to cause the colloid to be too low in fluidity and difficult to be dispersed into a film. In some embodiments, the revolution speed may be, for example, 60 rpm±50%, the rotation speed may be, for example, 3500 rpm±10%, and the stirring time may be between 2 hours and 5 hours. After sufficient mixing, the colloid is obtained and the first polymer, the second polymer, the first lithium salt, the solid-state electrolyte, and the solvent are evenly distributed in the colloid.

Then, the colloid is defoamed, and the defoamed colloid is introduced into an intermittent coating equipment for coating. In some embodiments, the coating is performed through knife coating at a certain wet-film thickness. In some embodiments, the coating is carried out for 30 seconds to 90 seconds at a speed of 0.4 m/min to 0.8 m/min to ensure that the excess colloid on the inside the blade has flowed back, and then the coating is continued at a speed of 0.2 m/min to 0.4 m/min until the colloid is exhausted. Next, the surface of the coated colloid is dried in the equipment such as an oven with a baking distance of 5 m to 15 m and a temperature of 100° C. to 130° C. Then, the coated colloid is subjected to a deep drying treatment at a temperature of 125° C. to 135° C. for 0.5 hour to 1 hour in a baking equipment of unidirectional heating such as a heating plate. After the above steps, the first baking process is completed.

Subsequently, the film formed after the completion of the first baking process is placed in the equipment, such as an oven, for a second baking process. In some embodiments, the second baking process may include a first stage and a second stage, in which the baking temperature of the first stage is between 80° C. and 100° C., and the baking time of the first stage is between 0.5 hour and 1 hour, while the baking temperature of the second stage is between 160° C. and 180° C., and the baking time of the second stage is between 0.5 hour and 1 hour. As mentioned above, the solvent on the surface of the film can be completely removed during the first stage of the baking process, and then the temperature is gradually increased to the glass transition temperature (Tg) of the polymer in the film during the second stage of the baking process to make the polymer reach a partially molten state, such that the polymer begins to flow to fill the holes or defects caused by the solvent evaporation, thereby enhancing the structural integrity of the solid-state electrolyte film 130. After the above steps, the solid-state electrolyte film 130 of the present disclosure can be obtained.

Next, the gel structure 160 is formed on the surface of the positive electrode material layer 120 facing away from the positive electrode current collector 150 by coating, and then the solid-state electrolyte film 130 is adhered to the surface of the gel structure 160 facing away from the positive electrode material layer 120. After standing at room temperature for 0.5 to 1.5 hours, it is dried in a vacuum drying oven to obtain a half-electrode sheet, including the positive electrode material layer 120, the positive electrode current collector 150, and the solid-state electrolyte film 130, is obtained. Subsequently, the buffer structure 170 is formed on the surface of the solid-state electrolyte film 130 facing away from the gel structure 160. In detail, if the buffer structure 170 is a gel structure 160, it is formed by coating; and if the buffer structure 170 is an ionic liquid, it is formed by dripping, and after the ionic liquid is fully penetrated into the solid-state electrolyte film 130, the negative electrode material layer 110 that has been disposed on the negative electrode current collector 140 is pressed onto the solid-state electrolyte film 130 through the buffer structure 170 (the gel structure 160 or the ionic liquid). Afterwards, the whole structure is placed in a vacuum drying oven for drying, such that the solid-state battery 100 is formed.

According to the aforementioned embodiments of the present disclosure, since the solid-state electrolyte film of the present disclosure includes the first lithium salt, the first polymer, the second polymer, and the solid-state electrolyte with a specific particle size, the solid-state electrolyte film can have higher ionic conductivity at room temperature, and thus the overall performance of the solid-state battery can be improved. In addition, the configuration of the buffer structure and the gel structure can reduce the interface impedance between the solid-state electrolyte film and the positive/negative electrode material layer and increase the ionic conductivity, thereby improving the overall performance of the solid-state battery. On the other hand, since the first polymer may further include three different molecular weights of polymers, and the solid-state electrolyte may further have three different particle sizes (D50), it can facilitate the film formation of the solid-state electrolyte and have a stable main structure, and enable the solid-state electrolyte film to have excellent mechanical strength, while enabling the solid-state electrolyte to be completely and uniformly dispersed in the solid-state electrolyte film. In addition, since the first lithium salt, the first polymer, the second polymer, and the solid-state electrolyte are directly integrated into a single film to form the solid-state electrolyte film, the convenience of the manufacturing process can be greatly improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A solid-state electrolyte film, comprising:
   a first lithium salt;
   a first polymer, wherein the first polymer has a weight average molecular weight of between 60,000 g/mol and 1,800,000 g/mol, and the weight average molecular weight comprises a first weight average molecular weight, a second weight average molecular weight, and a third weight average molecular weight, each being different from one another;
   a second polymer having a granular shape; and
   a solid-state electrolyte having a granular shape and a particle size (D50) of between 50 nanometers and 2 microns.

2. The solid-state electrolyte film of claim 1, wherein the first lithium salt, the first polymer, the second polymer, and the solid-state electrolyte have a weight ratio of 16 to 25:26 to 34:5 to 20:10 to 40.

3. The solid-state electrolyte film of claim 1, wherein the first polymer is a fluorine-containing polymer.

4. The solid-state electrolyte film of claim 1, wherein the first polymer has a melting point of between 160° C. and 175° C. and a thermal stability temperature of between 300° C. and 400° C.

5. The solid-state electrolyte film of claim 1, wherein the first lithium salt comprises lithium fluoride, lithium bis(fluorosulfonyl)imide, lithium bis(trifluoromethane)sulfonimide, lithium bis(tetrafluoroethane)sulfonimide, lithium bis(oxalato)borate, or combinations thereof.

6. The solid-state electrolyte film of claim 1, wherein the first polymer comprises polyvinylidene difluoride, polyvinylidene fluoride-hexafluoropropylene copolymer, or combinations thereof, and the second polymer comprises poly (acrylic acid), polymethyl methacrylate, boron trifluoride-diethyl etherate complex, polyethylene glycol, poly (ethylene glycol) diglycidyl ether, or combinations thereof.

7. The solid-state electrolyte film of claim 1, wherein the solid-state electrolyte comprises lithium lanthanum zirconium oxide, lithium lanthanum zirconium tantalum oxide, lithium lanthanum titanium oxide, lithium lanthanum tantalum oxide, titanium lithium aluminum phosphate, or combinations thereof.

8. The solid-state electrolyte film of claim 1, wherein the first weight average molecular weight is between 800,000 g/mol and 1,000,000 g/mol, the second weight average molecular weight is between 1,300,000 g/mol and 1,500,000 g/mol, and the third weight average molecular weight is between 60,000 g/mol and 200,000 g/mol.

9. The solid-state electrolyte film of claim 8, wherein the first polymer with the first weight average molecular weight, the first polymer with the second weight average molecular weight, and the first polymer with the third weight average molecular weight have a weight ratio of 6 to 10:1.5 to 3:1.

10. The solid-state electrolyte film of claim 1, wherein the solid-state electrolyte has a first particle size (D50), a second particle size (D50), and a third particle size (D50), the first particle size (D50) is between 0.8 microns and 1.4 microns, the second particle size (D50) is between 0.25 microns and 0.5 microns, and the third particle size (D50) is between 80 nanometers to 150 nanometers.

11. The solid-state electrolyte film of claim 10, wherein the solid-state electrolyte with the first particle size (D50), the solid-state electrolyte with the second particle size (D50), and the solid-state electrolyte with the third particle size (D50) have a weight ratio of 10 to 20:30 to 45:35 to 50.

12. A solid-state battery, comprising:

the solid-state electrolyte film of claim 1, wherein the solid-state electrolyte film has a thickness of between 20 microns and 70 microns; and a positive electrode and a negative electrode respectively disposed on two opposite surfaces of the solid-state electrolyte film.

13. The solid-state battery of claim 12, further comprising:

a gel structure disposed between the positive electrode and the solid-state electrolyte film, wherein the gel structure comprises:

a second lithium salt;

the first polymer; and a crystallization inhibiting additive; and a buffer structure disposed between the negative electrode and the solid-state electrolyte film, wherein the buffer structure is the gel structure or an ionic liquid.

14. The solid-state battery of claim 13, wherein the gel structure has a thickness of between 1 microns and 10 microns, and a volume of the ionic liquid on the solid-state electrolyte film is between 10 μL and 40 μL per square centimeter.

15. The solid-state battery of claim 12, wherein the first polymer is a fluorine-containing polymer.

16. The solid-state battery of claim 12, wherein the first lithium salt comprises lithium fluoride, lithium bis(fluorosulfonyl)imide, lithium bis(trifluoromethane)sulfonimide, lithium bis(tetrafluoroethane)sulfonimide, lithium bis(oxalato)borate, or combinations thereof.

17. The solid-state battery of claim 12, wherein the first polymer comprises polyvinylidene difluoride, polyvinylidene fluoride-hexafluoropropylene copolymer, or combinations thereof, and the second polymer comprises poly (acrylic acid), polymethyl methacrylate, boron trifluoride-diethyl etherate complex, polyethylene glycol, poly (ethylene glycol) diglycidyl ether, or combinations thereof.

18. The solid-state battery of claim 12, wherein the solid-state electrolyte comprises lithium lanthanum zirconium oxide, lithium lanthanum zirconium tantalum oxide, lithium lanthanum titanium oxide, lithium lanthanum tantalum oxide, titanium lithium aluminum phosphate, or combinations thereof.

19. The solid-state battery of claim 13, wherein the second lithium salt comprises lithium bis(fluorosulfonyl)imide, lithium bis(trifluoromethane)sulfonimide, lithium(fluorosulfonyl)((3-(1-methyl-1H-imidazol-3-ium-3-yl)propyl) sulfonyl)imide), N,N-bis(trifluoromethylsulfonyl aniline), or combinations thereof.

20. The solid-state battery of claim 13, wherein the second lithium salt, the first polymer, and the crystallization inhibiting additive have a weight ratio of 15 to 30:30 to 40:5 to 15.

\* \* \* \* \*